(12) United States Patent
Shibata (10) Patent No.: US 11,159,028 B2
(45) Date of Patent: Oct. 26, 2021

(54) BATTERY CONTROL CIRCUIT, BATTERY CONTROL DEVICE, AND BATTERY PACK

(71) Applicant: Kohei Shibata, Tokyo (JP)

(72) Inventor: Kohei Shibata, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 201 days.

(21) Appl. No.: 16/138,226

(22) Filed: Sep. 21, 2018

(65) Prior Publication Data

US 2019/0181655 A1    Jun. 13, 2019

(30) Foreign Application Priority Data

Dec. 8, 2017    (JP) .............................. JP2017-236115

(51) Int. Cl.
*H02J 7/00*     (2006.01)
*H01M 10/42*   (2006.01)

(52) U.S. Cl.
CPC ......... *H02J 7/0016* (2013.01); *H01M 10/425* (2013.01); *H01M 10/4207* (2013.01); *H02J 7/0026* (2013.01); *H01M 2010/4271* (2013.01); *H02J 7/0021* (2013.01)

(58) Field of Classification Search
CPC ...... H02J 7/0016; H02J 7/0026; H02J 7/0021; H02J 7/00; H01M 10/425; H01M 10/4207; H01M 10/42; H01M 2010/4271
USPC ......................................................... 320/118
See application file for complete search history.

(56) References Cited

U.S. PATENT DOCUMENTS

| 5,886,502 A | 3/1999 | Higashijima |
| 2009/0091294 A1 | 4/2009 | Gong et al. |
| 2009/0198399 A1* | 8/2009 | Kubo ..................... G01R 31/36 701/22 |
| 2011/0018588 A1* | 1/2011 | Notman .............. H02M 3/1588 327/87 |

(Continued)

FOREIGN PATENT DOCUMENTS

| JP | H10-050352 | 2/1998 |
| JP | 2009-201345 | 9/2009 |

(Continued)

OTHER PUBLICATIONS

Japanese Office Action for 2017-236115 dated Oct. 16, 2018.

*Primary Examiner* — Richard Isla
*Assistant Examiner* — Dung V Bui
(74) *Attorney, Agent, or Firm* — IPUSA, PLLC (57) ABSTRACT

A battery control circuit controls a balance of cell voltage values of cells coupled in series, and includes connection terminals respectively coupling to a positive electrode of a corresponding cell, a ground terminal coupled to an internal ground of the battery control circuit and coupling to a negative electrode of a cell located at a lowest stage of the cells, a control circuit to select, from the connection terminals, at least one connection terminal coupled to the internal ground via an internal current path of the battery control circuit, and a current generation circuit to supply a terminal current whose current value varies according to the cell voltage value of the cell whose positive electrode is coupled to the at least one of the connection terminals selected by the control circuit, from the at least one of the connection terminals to the internal ground via the internal current path.

15 Claims, 4 Drawing Sheets

(56) References Cited

U.S. PATENT DOCUMENTS

| | | | |
|---|---|---|---|
| 2013/0041606 A1* | 2/2013 | Tang | G01R 31/54 |
| | | | 702/63 |
| 2013/0069597 A1 | 3/2013 | Sugimura | |
| 2013/0202918 A1 | 8/2013 | Kimura | |
| 2014/0016239 A1* | 1/2014 | Kim | H02H 11/007 |
| | | | 361/92 |
| 2014/0043032 A1* | 2/2014 | Makino | G01R 31/007 |
| | | | 324/434 |
| 2014/0306662 A1* | 10/2014 | Kim | H02J 7/007 |
| | | | 320/118 |
| 2014/0327400 A1* | 11/2014 | Kudo | B60L 50/51 |
| | | | 320/118 |
| 2015/0077124 A1* | 3/2015 | Suzuki | H02J 7/0021 |
| | | | 324/426 |

FOREIGN PATENT DOCUMENTS

| | | |
|---|---|---|
| JP | 2013-070481 | 4/2013 |
| JP | 2013-162581 | 8/2013 |

\* cited by examiner

BATTERY CONTROL CIRCUIT, BATTERY CONTROL DEVICE, AND BATTERY PACK

CROSS-REFERENCE TO RELATED APPLICATIONS

This application is based on and claims priority to Japanese Patent Application No. 2017-236115 filed on Dec. 8, 2017, the entire contents of which are incorporated herein by reference.

BACKGROUND OF THE INVENTION

1. Field of the Invention

The present invention relates to a battery control circuit, a battery control device, and a battery pack.

2. Description of the Related Art

An example of a conventional balancing circuit balances voltages of a plurality of cells that are connected in series. The balancing circuit proposed in Japanese Laid-Open Patent Publication No. 2009-201345, for example, includes a plurality of current regulators respectively causing a current flow from a positive electrode to ground of a corresponding one of the plurality of cells, so that a bypass route is formed for each of the plurality of cells.

However, according to the proposed balancing circuit, a constant current generated by the current generator flows to a terminal that is connected to the positive electrode of the cell, regardless of a magnitude of a cell voltage value of the cell. Consequently, it is difficult to efficiently balance the cell voltage values of each of the plurality of cells.

SUMMARY OF THE INVENTION

Embodiments of the present invention can provide a battery control circuit, a battery control device, and a battery pack, which can efficiently balance each of cell voltage values of a plurality of cells that are connected in series.

According to one aspect of embodiments of the present invention, a battery control circuit for controlling a balance of cell voltage values of a plurality of cells that are coupled in series, includes a plurality of connection terminals respectively configured to couple to a positive electrode of a corresponding one of the plurality of cells; a ground terminal configured to couple to an internal ground of the battery control circuit, and couple to a negative electrode of a cell located at a lowest stage of the plurality of cells; a control circuit configured to select, from the plurality of connection terminals, at least one of the plurality of connection terminals coupled to the internal ground via an internal current path of the battery control circuit; and a current generation circuit configured to supply a terminal current whose current value varies according to the cell voltage value of the cell whose positive electrode is coupled to the at least one of the plurality of connection terminals selected by the control circuit, from the at least one of the plurality of connection terminals selected by the control circuit to the internal ground via the internal current path.

According to another aspect of the embodiments of the present invention, a battery control circuit for controlling a balance of cell voltage values of a plurality of cells that are coupled in series, includes a plurality of connection terminals respectively configured to couple to a positive electrode of a corresponding one of the plurality of cells; a ground terminal configured to couple to an internal ground of the battery control circuit, and couple to a negative electrode of a cell located at a lowest stage of the plurality of cells; a current generation circuit configured to generate a plurality of terminal currents having current values that respectively vary according to a voltage value between two mutually adjacent terminals among the plurality of connection terminals and the ground terminal; and a control circuit configured to select, from the plurality of terminal currents, at least one of the plurality of terminal currents to flow from one of the two mutually adjacent terminals having a higher potential to the internal ground via an internal current path of the battery control circuit.

According to still another aspect of the embodiments, a battery control circuit for controlling a balance of cell voltage values of a plurality of cells that are coupled in series, includes a plurality of connection terminals respectively configured to couple to a positive electrode of a corresponding one of the plurality of cells; a ground terminal configured to couple to an internal ground of the battery control circuit, and couple to a negative electrode of a cell located at a lowest stage of the plurality of cells; a control circuit configured to select, from the plurality of cells, at least one of the plurality of cells to be discharged; and a current generation circuit configured to supply a terminal current whose current value varies according to a cell voltage value of one of the plurality of cells selected by the control circuit, from one of the plurality of connection terminals coupled to a positive electrode of the one of the plurality of cells selected by the control circuit to the internal ground via an internal current path of the battery control circuit.

According to a further aspect of the embodiments, a battery control device includes a cell balance circuit configured to balance cell voltage values of a plurality of cells coupled in series; and a battery control circuit configured to control the cell balance circuit, wherein the battery control circuit includes a plurality of connection terminals respectively configured to couple to a positive electrode of a corresponding one of the plurality of cells, a ground terminal configured to couple to an internal ground of the battery control circuit, and couple to a negative electrode of a cell located at a lowest stage of the plurality of cells, a control circuit configured to select, from the plurality of connection terminals, at least one of the plurality of connection terminals coupled to the internal ground via an internal current path of the battery control circuit, and a current generation circuit configured to supply a terminal current whose current value varies according to the cell voltage value of the cell whose positive electrode is coupled to the at least one of the plurality of connection terminals selected by the control circuit, from the at least one of the plurality of connection terminals selected by the control circuit to the internal ground via the internal current path.

According to another aspect of the embodiments, a battery pack includes a plurality of cells coupled in series; a cell balance circuit configured to balance cell voltage values of the plurality of cells; and a battery control circuit configured to control the cell balance circuit, wherein the battery control circuit includes a plurality of connection terminals respectively configured to couple to a positive electrode of a corresponding one of the plurality of cells, a ground terminal configured to couple to an internal ground of the battery control circuit, and couple to a negative electrode of a cell located at a lowest stage of the plurality of cells, a control circuit configured to select, from the plurality of connection terminals, at least one of the plurality of connection terminals coupled to the internal ground via an internal current path of the battery control circuit, and a current generation circuit configured to supply a terminal current whose current value varies according to the cell voltage value of the cell whose positive electrode is coupled to the at least one of the plurality of connection terminals selected by the control circuit, from the at least one of the plurality of connection terminals selected by the control circuit to the internal ground via the internal current path.

Other objects and further features of the present invention will be apparent from the following detailed description when read in conjunction with the accompanying drawings.

DESCRIPTION OF THE PREFERRED EMBODIMENTS

Embodiments of a battery control circuit, a battery control device, and a battery pack according to the present invention will be described, by referring to the drawings.

Figure 1:
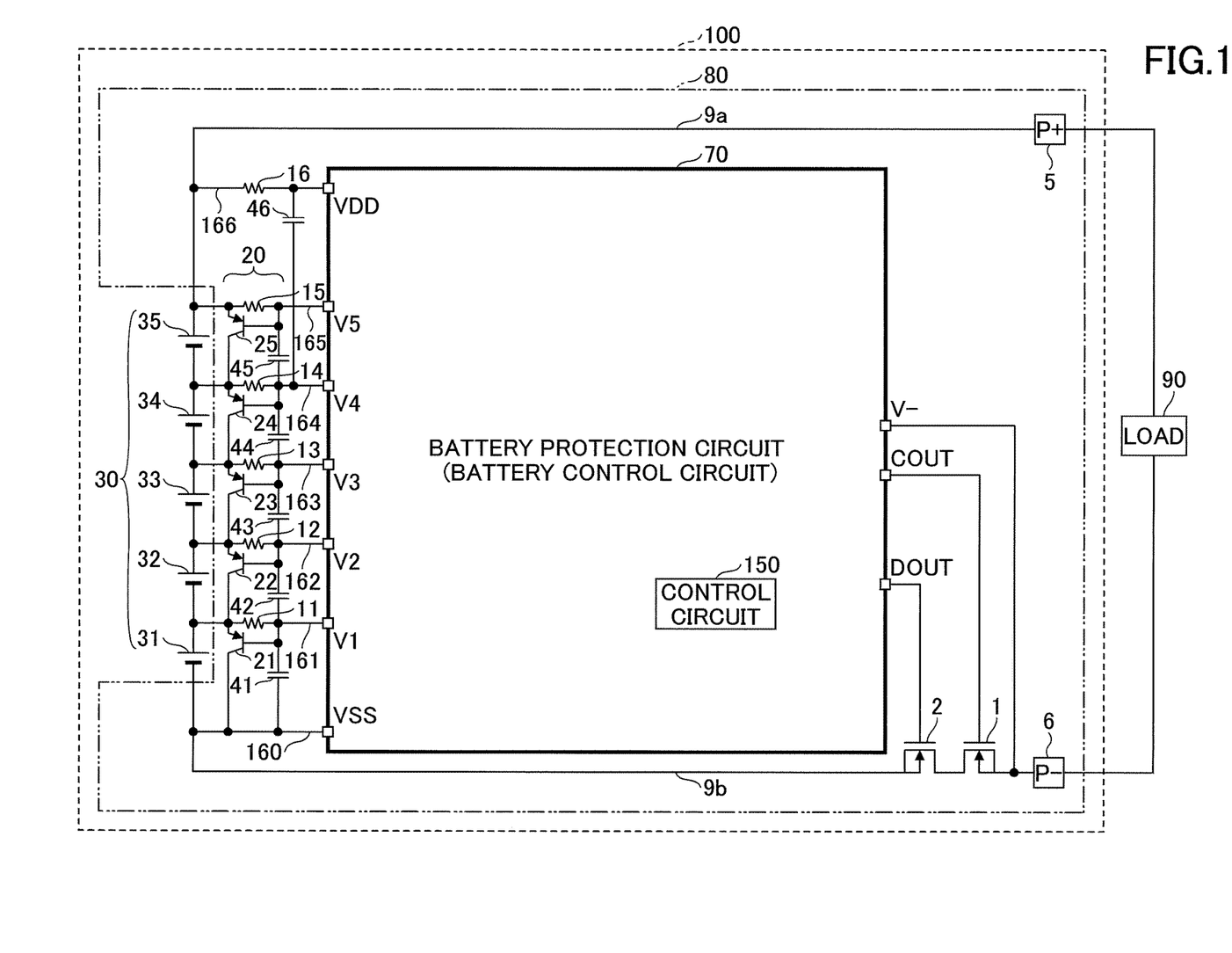
FIG. 1 is a diagram illustrating a structure of an example of a battery pack.

FIG. 1 is a diagram illustrating a structure of an example of a battery pack. A battery pack 100 illustrated in FIG. 1 includes a rechargeable battery 30, and a battery protection device 80.

The rechargeable battery 30 is an example of a secondary battery that is chargeable and dischargeable. The rechargeable battery 30 can supply power to a load 90 that is connected to a positive terminal 5 (P+ terminal) and a negative terminal 6 (P− terminal). The rechargeable battery 30 can be charged by a charger (not illustrated) that is connected to the positive terminal 5 and the negative terminal 6. Examples of the rechargeable battery 30 include a lithium ion battery, a lithium polymer battery, or the like. The battery pack 100 may be included in the load 90, that is, built-in to the load 90. Alternatively, the battery pack 100 may be connected externally to the load 90.

The load 90 is an example of a load that uses the rechargeable battery 30 of the battery pack 100 as a power source. Examples of the load 90 include electronic devices such as a portable terminal device, or the like. The electronic devices may include a mobile phone, a smart phone, a tablet type computer, a game device, a television set, a music or video player, a camera, or the like. Of course, the load 90 is not limited to the devices described above.

The rechargeable battery 30 includes a plurality of cells that are connected in series. In the example illustrated in FIG. 1, the rechargeable battery 30 includes five cells 31 through 35 that are connected in series. A positive electrode of the rechargeable battery 30 is connected to a positive electrode of the cell 35 located at a highest stage having a highest potential among the cells 31 through 35 forming the rechargeable battery 30. A negative electrode of the rechargeable battery 30 is connected to a negative electrode of the cell 31 located at a lowest stage having a lowest potential among the cells 31 through 35 forming the rechargeable battery 30. The positive electrode of the cell refers to an electrode on a high potential side of the cell. On the other hand, the negative electrode of the cell refers to an electrode on a low potential side of the cell.

The battery protection device 80 is an example of a battery control device that operates using the rechargeable battery 30 as a power source. The battery protection device 80 controls charging and discharging of the rechargeable battery 30, to protect the rechargeable battery 30 from overcharge, overdischarge, or the like. The battery protection device 80 includes the positive terminal 5, the negative terminal 6, a cell balancing circuit 20, a charge control transistor 1, a discharge control transistor 2, and a battery protection circuit 70.

The positive terminal 5 is an example of a terminal that may be connected to a power source terminal of the load 90 or the charger. The negative terminal 6 is an example of a terminal that may be connected to the ground of the load 90 or the charger.

The positive electrode (positive electrode of the cell 35) of the rechargeable battery 30 and the positive terminal 5 are connected by a positive power supply path 9a, and the negative electrode (negative electrode of the cell 31) of the rechargeable battery 30 and the negative terminal 6 are connected by a negative power supply path 9b. The positive power supply path 9a is an example of a charging and discharging current path between the positive electrode of the rechargeable battery 30 and the positive terminal 5. The negative power supply path 9b is an example of a charging and discharging current path between the negative electrode of the rechargeable battery 30 and the negative terminal 6.

The negative electrode of the rechargeable battery 30 (a negative electrode of the cell 31) is connected to a VSS terminal via a wiring 160. A positive electrode of the cell 31 and a negative electrode of the cell 32 are connected to a V1 terminal via a wiring 161. A resistor 11 is inserted in series to the wiring 161. A positive electrode of the cell 32 and a negative electrode of the cell 33 are connected to a V2 terminal via a wiring 162. A resistor 12 is inserted in series to the wiring 162. A positive electrode of the cell 33 and a negative electrode of the cell 34 are connected to a V3 terminal via a wiring 163. A resistor 13 is inserted in series to the wiring 163. A positive electrode of the cell 34 and a negative electrode of the cell 35 are connected to a V4 terminal via a wiring 164. A resistor 14 is inserted in series to the wiring 164. A positive electrode of the rechargeable battery 30 (a positive electrode of the cell 35) is connected to a V5 terminal via a wiring 165, and is connected to a VDD terminal via a wiring 166. A resistor 15 is inserted in series to the wiring 165. A resistor 16 is inserted in series to the wiring 166.

The resistor 16 is inserted in series to the wiring 166, and one end of a capacitor element 46 is connected to the wiring 166 and the other end of the capacitor element 46 is connected to the wiring 164. The resistor 16 and the capacitor element 46 form a lowpass filter that smoothens a power source voltage that is applied to the VDD terminal.

The cell balancing circuit 20 is an equalization circuit that balances the voltage values of each of the cells 31 through 35, and reduces inconsistencies in the voltage values among the cells 31 through 35. The cell balancing circuit 20 includes five cell balancing circuit parts, that is, first through fifth cell balancing circuit parts, in correspondence with the five cells 31 through 35. A cell balancing circuit part is connected to the cell 31 via the wirings 160 and 161. A second cell balancing circuit part is connected to the cell 32 via the wirings 161 and 162. A third cell balancing circuit part is connected to the cell 33 via the wirings 162 and 163. A fourth cell balancing circuit part is connected to the cell 34 via the wirings 163 and 164. A fifth cell balancing circuit part is connected to the cell 35 via the wirings 164 and 165.

The first cell balancing circuit part discharges the cell 31 according to a terminal current IV1 flowing from the positive electrode of the cell 31 to the V1 terminal. The second cell balancing circuit part discharges the cell 32 according to a terminal current IV2 flowing from the positive electrode of the cell 32 to the V2 terminal. The third cell balancing circuit part discharges the cell 33 according to a terminal current IV3 flowing from the positive electrode of the cell 33 to the V3 terminal. The fourth cell balancing circuit part discharges the cell 34 according to a terminal current IV4 flowing from the positive electrode of the cell 34 to the V4 terminal. The fifth cell balancing circuit part discharges the cell 35 according to a terminal current IV5 flowing from the cell 35 to the V5 terminal. Each of the cells 31 through 35 is discharged so that the cell voltage values of the cells 31 through 35 become equal to each other, in order to maintain balance of the cell voltage values among the cells 31 through 35.

For example, the first cell balance circuit part has a discharge circuit including the resistor 11, a discharge transistor 21, and a capacitor element 41. The discharge transistor 21 is connected in parallel to the cell 31. The resistor 11 is inserted in series to the wiring 161. A voltage drop is generated across both ends of the resistor 11, due to the terminal current IV1 that flows to the V1 terminal and flows through the resistor 11. This voltage drop turns on the discharge transistor 21, to discharge the cell 31 via the discharge transistor 21.

The structures of the second through fifth cell balance circuit parts may be the same as the structure of the first cell balance circuit part, and a detailed description of the structures of the second through fifth cell balance circuit parts will be omitted. In addition, operations of the second through fifth cell balance circuit parts may be the same as the operation of the first cell balance circuit part, and a detailed description of the operations of the second through fifth cell balance circuit parts will be omitted.

Discharge transistors 21 through 25 are pnp type bipolar transistors, for example. For example, the discharge transistor 21 includes a collector connected to the negative electrode of the cell 31, an emitter connected to the positive electrode of the cell 31 and to one end of the resistor 11, and a base connected to the other end of the resistor 11. The structure and connection of each of the discharge transistors 22 through 25 are the same as the structure and connection of the discharge transistor 21, and a detailed description of the structure and connection of each of the discharge transistors 22 through 25 will be omitted.

The charge control transistor 1 is an example of a charge path cutoff part that cuts off a charging path of the rechargeable battery 30. The discharge control transistor 2 is an example of a discharge path cutoff part that cuts off a discharge path of the rechargeable battery 30. In the example illustrated in FIG. 1, the charge control transistor 1 cuts off the negative power supply path 9b through which a charge current of the rechargeable battery 30 flows. The discharge control transistor 2 cuts off the negative power supply path 9b through which a discharge current of the rechargeable battery 30 flows. The control transistors 1 and 2 are switching elements that switch the negative power supply path 9b between conducting and cutoff states, and are inserted in series to the negative power supply path 9b.

The control transistors 1 and 2 are N-channel MOS (Metal Oxide Semiconductor) transistors, for example.

In the following description, an N-channel MOS transistor may also be referred to as an "NMOS transistor", and a P-channel MOS transistor may also be referred to as a "PMOS transistor".

The battery protection circuit 70 is an example of the battery control circuit. The battery protection circuit 70 that is used in the battery protection device 80 is an IC (Integrated Circuit) that performs a protection operation on the cells 31 through 35 of the rechargeable battery 30. The battery protection circuit 70 includes a COUT terminal, a V– terminal, a DOUT terminal, the VDD terminal, the VSS terminal, the V1 terminal, the V2 terminal, the V3 terminal, the V4 terminal, the V5 terminal, and a control circuit 150, for example.

The COUT terminal is connected to the gate of the charge control transistor 1. The COUT terminal is an example of a charge control terminal that outputs a gate control signal to turn on or turn off the charge control transistor 1. The V– terminal is connected between the negative terminal 6 and the control transistors 1 and 2, in the negative power supply path 9b that connects the negative electrode of the rechargeable battery 30 and the negative terminal 6. The DOUT terminal is connected to the gate of the discharge control transistor 2. The DOUT terminal is an example of a discharge control terminal that outputs a gate control signal to turn on or turn off the discharge control transistor 2.

The VDD terminal is connected to the positive electrode of the cell 35 and the positive power supply path 9a. The VDD terminal is an example of a power source terminal of the battery protection circuit 70. The VDD terminal is connected to the positive electrode of the cell 35 via the resistor 16. The VSS terminal is connected to the negative electrode of the cell 31 and the negative power supply path 9b. The VSS terminal is an example of a ground terminal of the battery protection circuit 70.

The VSS terminal and the V1 terminal are terminals that are used to detect the cell voltage value of the cell 31. The V1 terminal and the V2 terminal are terminals that are used to detect the cell voltage value of the cell 32. The V2 terminal and the V3 terminal are terminals that are used to detect the cell voltage value of the cell 33. The V3 terminal and the V4 terminal are terminals that are used to detect the cell voltage value of the cell 34. The V4 terminal and the V5 terminal are terminals that are used to detect the cell voltage value of the cell 35. The terminal currents IV1 through IV5, that control discharge of the corresponding cells 31 through 35, flow to the corresponding V1 through V5 terminals. Accordingly, the V1 through V5 terminals are used in common as detection terminals for detecting the cell voltage values and control terminals for balancing the cells 31 through 35.

In a case in which an overcharge or an overcharge current of the rechargeable battery 30 is detected, for example, the control circuit 150 outputs, from the COUT terminal, the gate control signal that controls the charge control transistor 1 from the on state to the off state. By turning off the charge control transistor 1, the control circuit 150 prohibits a current from flowing in the negative power supply path 9b in a direction that charges the rechargeable battery 30.

In a case in which the overdischarge or the overdischarge current of the rechargeable battery 30 is detected, for example, the control circuit 150 outputs, from the DOUT terminal, the gate control signal that controls the discharge control transistor 2 from the on state to the off state. By turning off the discharge control transistor 2, the control circuit 150 prohibits a current from flowing in the negative power supply path 9b in a direction that discharges the rechargeable battery 30.

The control circuit 150 may be formed by a plurality of analog logic circuits, without using a CPU (Central Processing Unit), for example.

Figure 2:
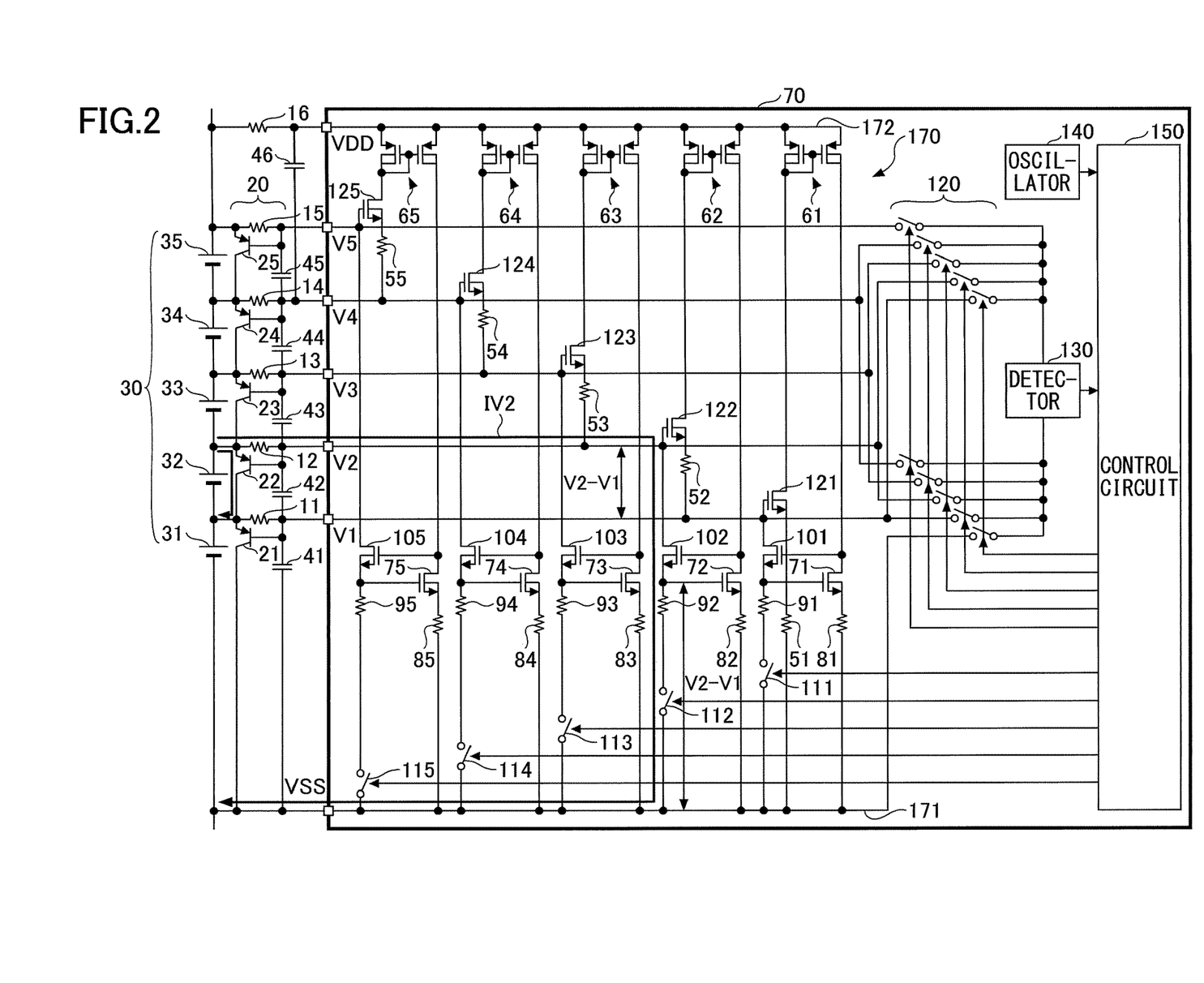
FIG. 2 is a diagram illustrating a structure of an example of a battery control circuit.

FIG. 2 is a diagram illustrating a structure of an example of the battery protection circuit 70. The battery protection circuit 70 is an example of the battery control circuit that controls the balance of each of the cell voltage values of the plurality of cells that are connected in series. The battery protection circuit 70 includes the VDD terminal, the V1 through V5 terminals, the VSS terminal, the control circuit 150, a current generation circuit 170, a switching circuit 120, a detector 130, and an oscillator 140, for example.

The VDD terminal is connected to an internal power source line 172 of the battery protection circuit 70. The VDD terminal is a power source terminal that is connected to the positive electrode of the cell located at the highest stage among the plurality of cells. Each of the V1 through V5 terminals is a connection terminal connected to the positive electrode of the corresponding one of the plurality of cells. The VSS terminal is connected to an internal ground 171 of the battery protection circuit 70. The VSS terminal is a ground terminal that is connected to the negative electrode of the cell located at the lowest stage among the plurality of cells.

In one embodiment, the control circuit 150 selects at least one connection terminal that is connected to the internal ground 171 via an internal current path of the battery protection circuit 70, from among the plurality of connection terminals, namely, the V1 through V5 terminals. For example, the control circuit 150 turns on at least one of selection switches 111 through 115, to select at least one connection terminal that is connected to the internal ground 171 via the internal current path of the battery protection circuit 70, from among the V1 through V5 terminals. In one embodiment, the current generation circuit 170 generates a terminal current whose current value varies according to the cell voltage value of the cell whose positive electrode may be connected to the connection terminal selected by the control circuit 150. The current generation circuit 170 supplies the terminal current that is generated, from the connection terminal selected by the control circuit 150, to the internal ground 171 via the internal current path of the battery protection circuit 70.

For example, in a case in which the V2 terminal is the connection terminal selected by the control circuit 150, the current generation circuit 170 generates the terminal current IV2 whose current value varies according to the cell voltage value of the cell 32. In addition, the current generation circuit 170 supplies the terminal current IV2 that is generated, as indicated by a bold arrow in FIG. 2, from the V2 terminal selected by the control circuit 150, to the internal ground 171 via the internal current path of the battery protection circuit 70.

Further, in one embodiment, the current generation circuit 170 generates a plurality of currents whose current values vary according to voltage values between two mutually adjacent terminals among the V1 through V5 terminals and the VSS terminal. The mutually adjacent terminals refer to a pair of terminals selected from among the six terminals including the V1 through V5 terminals and the VSS terminal. Examples of the pair of terminals forming the two mutually adjacent terminals includes a pair of the V3 terminal and the V2 terminal, a pair of the V1 terminal and the VSS terminal, or the like. In this embodiment, the control circuit 150 selects at least one terminal current, from among the plurality of terminal currents generated by the current generation circuit 170, to be supplied from the terminal having the higher potential between the two mutually adjacent terminals to the internal ground 171 via the internal current path of the battery protection circuit 70. For example, the control circuit 150 turns on at least one of the selection switches 111 through 115, to select at least one terminal current, from among the plurality of terminal currents generated by the current generation circuit 170, to be supplied from the terminal having the higher potential between the two mutually adjacent terminals to the internal ground 171 via the internal current path of the battery protection circuit 70.

In addition, in one embodiment, the control circuit 150 selects at least one cell that is to discharge, from among the plurality of cells 31 through 35. For example, the control circuit 150 turns on at least one of the selection switches 111 through 115, to select at least one cell that is to discharge. In this embodiment, the current generation circuit 170 generates the terminal current whose current value varies according to the cell voltage value of the cell that is to discharge and is selected by the control circuit 150. The current generation circuit 170 supplies the terminal current that is generated to the internal ground 171 via the internal current path of the battery protection circuit 70, from the connection terminal that may be connected to the positive electrode of the cell selected by the control circuit 150.

Next, a cell balance control that discharges at least one of the plurality of cells will be described. In the following description, a typical operation will be described for a case in which the cell 32 is discharged as indicated by a bold arrow in FIG. 2 when the battery protection circuit 70 performs the cell balance control.

In FIG. 2, the current generation circuit 170 performs a level-shift on a potential difference (or voltage) between the two mutually adjacent terminals forming each pair of terminals, among the V1 through V5 terminals and the VSS terminal, using the internal ground 171 connected to the VSS terminal as a reference. In addition, the current generation circuit 170 applies each of the level-shifted voltages across both ends of the corresponding one of resistors 91 through 95, to generate the corresponding one of the terminal currents.

More particularly, the V1 terminal is connected to a low potential end of the resistor 52, and the V2 terminal is connected to a gate of an NMOS transistor 122. The NMOS transistor 122 has the gate connected to the V2 terminal, a drain connected to an input part of a current mirror circuit 62, and a source connected to a high potential end of the resistor 52. Accordingly, a current value of a drain current of the NMOS transistor 52 can be represented by (V2−V1−Vth)/R52, where V2−V1 denotes a potential difference between the V2 terminal and the V1 terminal, Vth denotes a gate-source voltage between the gate and the source of the NMOS transistor 122, and R52 denotes a resistance value of the resistor 52.

The drain current of the NMOS transistor 122 is loops back from the current mirror circuit 62, and flows to a drain of an NMOS transistor 72 from an output part of the current mirror circuit 62. The current mirror circuit 62 is formed by a pair of PMOS transistors. The NMOS transistor 72 includes the drain connected to the output part of the current mirror circuit 62, a source connected to the internal ground 171 via a resistor 82, and a gate connected to a source of an NMOS transistor 102. The NMOS transistor 102 includes a source connected to the internal ground 171 via a resistor 92 and the selection switch 112, a drain connected to the gate of the NMOS transistor 122 and the V2 terminal, and the gate connected to the drain of the NMOS transistor 72. The NMOS transistors 72 and 122 have transistor characteristics that are the same, and the resistors 52 and 82 have resistance values that are the same. In addition, the current mirror circuit 62 has a current mirror characteristic such that an input output current ratio (that is, a ratio of an input current to an output current) is 1:1.

Accordingly, according to the circuit structure described above, the gate-source voltage of the NMOS transistor 122 becomes the same as the gate-source voltage of the NMOS transistor 102, due to a feedback provided by the NMOS transistor 102. In other words, the potential difference between the V2 terminal and the V1 terminal is level-shifted to the voltage of the VSS terminal, and the level-shifted voltage after the level-shift is applied to the resistor 92. Hence, when the selection switch 112 is turned on, the terminal current IV2, having a current value (V2−V1)/R92 flows from the V2 terminal to the internal ground 171 via the NMOS transistor 102, the resistor 92, and the selection switch 112. As described above, V2−V1 denotes the potential difference between the V2 terminal and the V1 terminal, and R92 denotes a resistance value of the resistor 92.

When the terminal current IV2 flows, a base current of a discharge transistor 22 increases, and the discharge transistor 22 turns on. Hence, the cell 32 discharges with a collector current that is hfe times the base current of the discharge transistor 22, where hfe denotes a DC current amplification of a bipolar transistor.

A current value Ib22 of the base current of the discharge transistor 22 can be represented by the following formula.

$$Ib22 = (V2 - V1)/R92 - Vf/R12$$
$$= (V2CELL - V1)/R92 - V1/R12.$$

In the above formula, Vf denotes a forward voltage between the base and the emitter of the discharge transistor 22, R12 denotes a resistance value of the resistor 12, and V2CELL denotes a cell voltage value between the positive electrode and the negative electrode of the cell 32.

For example, when the cell voltage value of the cell 32 is 4.2 V, the current value Ib22 of the base current is 6.3 mA. When the cell voltage value of the cell 32 is 3.9 V, the current value Ib22 of the base current is 8.7 mA. When the cell voltage value of the cell 32 is 3.6 V, the current value Ib22 of the base current is 5.1 mA. In this example, Vf=0.7 V, R92=500Ω, and R12=1 kΩ.

Accordingly, the current value (=(V2−V1)/R92) of the terminal current IV2 increases as the cell voltage value of the cell 32 becomes higher. The same holds true for each of the other terminal currents IV1 and IV3 through IV5. In other words, the current value of each terminal current when performing the cell balance control varies according to the corresponding cell voltage value. Hence, it is possible to supply a large terminal current to the terminal to which the positive electrode of the cell having the large cell voltage value is connected, and it is possible to supply a small terminal current to the terminal to which the positive electrode of the cell having the small cell voltage value is connected. For this reason, even if the cell voltage values are inconsistent among the plurality of cells, it is possible to shorten a time it takes for the cell voltage values to converge to the same cell voltage value. As a result, it is possible to efficiently balance the cell voltage values of each of the plurality of cells 31 through 35 that are connected in series.

In addition, the current value Ib22 of the base current increases as the cell voltage value of the cell 32 becomes higher. For this reason, a current value of a collector current of the discharge transistor 22 (that is, a discharge current of the cell 32 also increases. The same holds true for a discharge current of each of the other cells 31 and 33 through 35. In other words, the current value of each discharge current when performing the cell balance control varies according to the corresponding cell voltage value. Hence, it is possible to shorten the time it takes for the cell voltage values of each of the plurality of cells 31 through 35 to converge to the same cell voltage value. As a result, it is possible to efficiently balance the cell voltage values of each of the plurality of cells 31 through 35 that are connected in series.

In the current generation circuit 170, the structure of current generation parts connected to the V1 terminal, the V3 terminal, the V4 terminal, and the V5 terminal may be the same as the above described structure of a current generation part connected to the V2 terminal, and thus, a detailed description of the structures of the current generation parts will be omitted.

Figure 3:
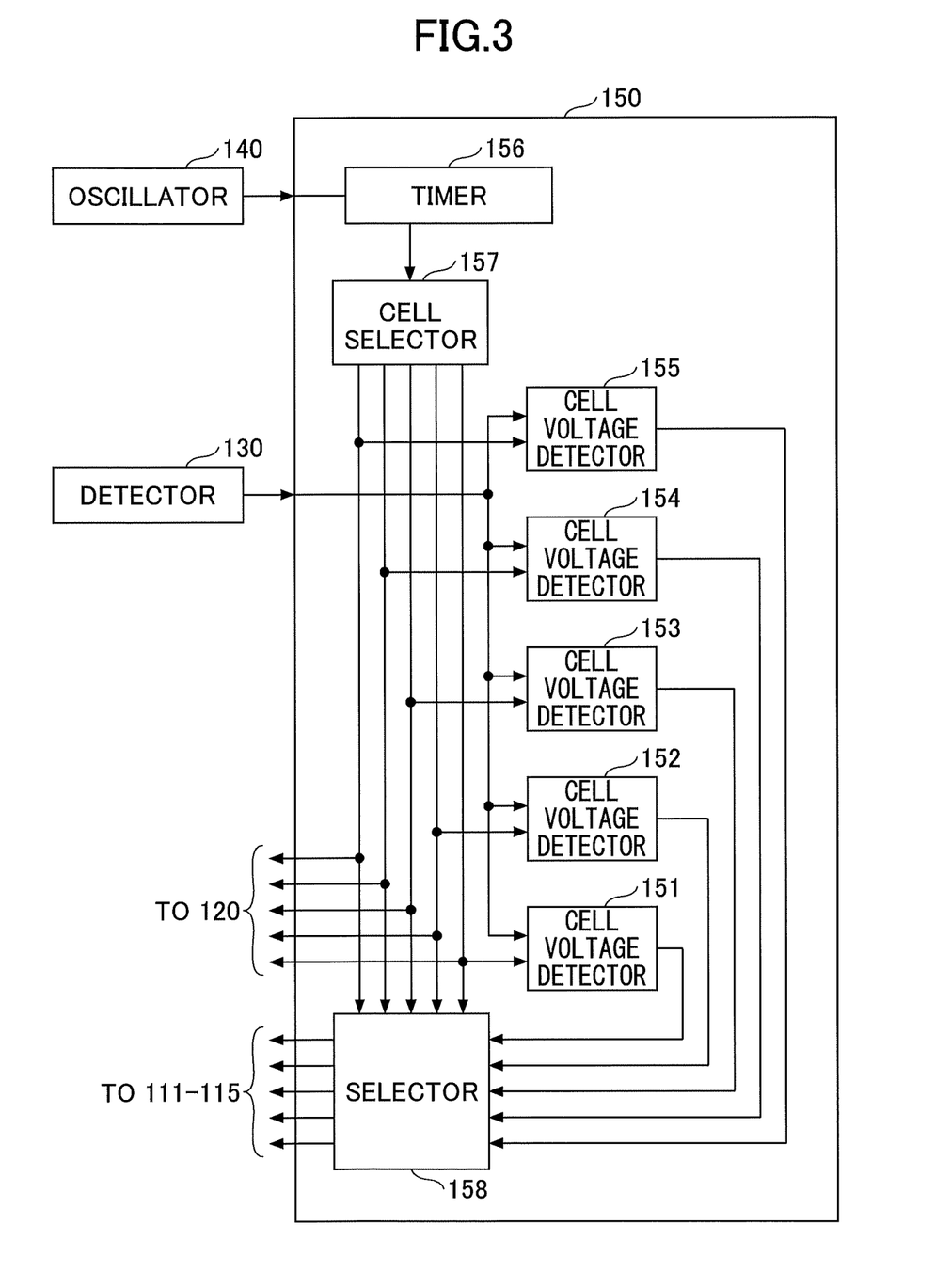
FIG. 3 is a functional block diagram illustrating an example of a control circuit.

FIG. 3 is a functional block diagram illustrating an example of the control circuit 150. The control circuit 150 includes a timer 156, a cell selector 157, cell voltage detectors 151 through 155, and a selector 158.

In one embodiment, the timer 156 is a circuit block that sets monitoring times (or durations) for which the detector 130 is to monitor the cell voltage values of the plurality of cells 31 through 35, respectively.

The cell selector 157 selects a monitoring target whose cell voltage value is to be monitored, from among the plurality of cells 31 through 35. In one embodiment, the cell selector 157 is a circuit block that generates switching signals for switching the cells whose cell voltage values are to be monitored by the detector 130 during the monitoring times set by the timer 156. The switching signals are supplied to the cell voltage detectors 151 through 155, respectively, and to the selector 158 and the switching circuit 120 illustrated in FIG. 2.

The switching circuit 120 selects at least one of the plurality of cells 31 through 35 to be connected to the detector 130, based on the switching signals supplied from the cell selector 157. The detector 130 can monitor the cell voltage value of the cell that is connected to the detector 130, but cannot monitor the cell voltage value of the cell that is not connected to the detector 130.

The cell voltage detectors 151 through 155 illustrated in FIG. 3 acquire monitored results of the cell voltage values of the monitoring targets selected by the cell selector 157. In one embodiment, the cell voltage detectors 151 through 155 are circuit blocks that acquire the monitored results from the detector 130 during the monitoring times of the cell voltage values of the cells that are the monitoring targets, respectively, and hold the acquired cell voltage values during times other than the respective monitoring times.

The selector 158 selects at least one of the V1 through V5 terminals to which the terminal current is to be supplied, using the monitored results acquired by the cell voltage detectors 151 through 155 and a result of the cell selection made by the cell selector 157. In one embodiment, the selector 158 outputs selection signals for turning on or turning off the selection switches 111 through 115 illustrated in FIG. 2, according to inputs from the cell voltage detectors 151 through 155 and the cell selector 157.

Figure 4:
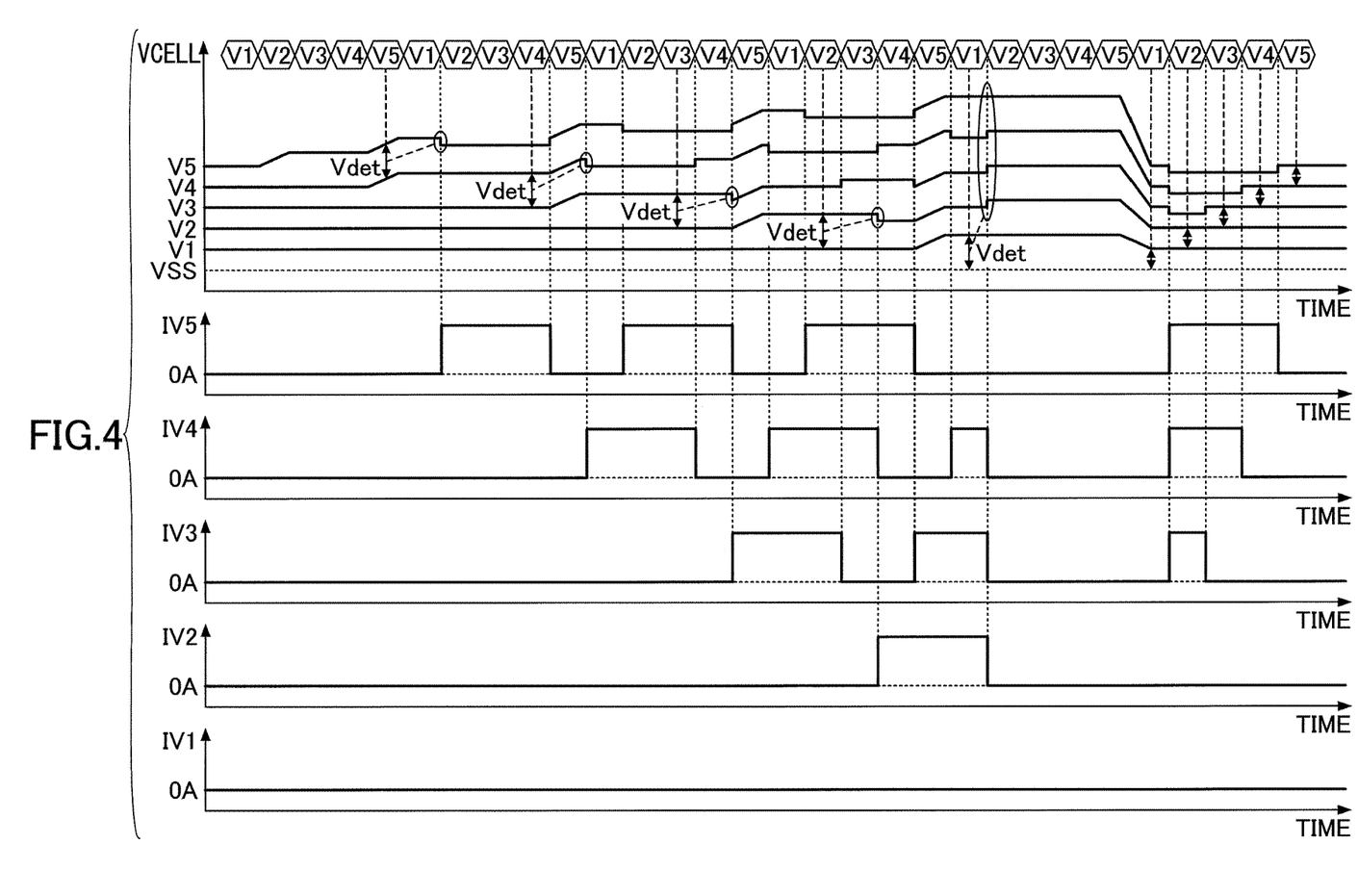
FIG. 4 is a timing chart illustrating an example of an operation of the battery control circuit.

FIG. 4 is a timing chart illustrating an example of an operation of the battery protection circuit 70. In this example of the operation, one detector 130 sequentially monitors, one by one, the cell voltage value of each of the cells. The cell whose cell voltage value is monitored by the detector 130 and the corresponding monitoring time are illustrated at a top part in FIG. 4. In FIG. 4, the abscissa indicates the time. In FIG. 4, VCELL of the ordinate indicates the cell voltage value between the positive electrode and the negative electrode of the cell, or the voltage value between two mutually adjacent terminals among the V1 through V5 terminals and the VSS terminal. In FIG. 4, IV1 through IV5 of the ordinate indicate the current values of the terminal currents IV1 through IV5, respectively. The timing chart of FIG. 4 illustrates the example of the operation for a case in which the cell voltage value exceeds a cell balance threshold value Vdet in an order of the cell 35, the cell 34, the cell 33, the cell 32, and the cell 31. The balance threshold value Vdet is an example of a first threshold value.

Next, a description will be given of the operation illustrated in FIG. 4, by referring to FIG. 2 and FIG. 3.

The detector 130 time-divisionally monitors each of the cell voltage values. The cell voltage detectors 151 through 155 acquire the cell voltage values from the detector 130, and determine whether the cell voltage values of the corresponding cells 31 through 35 exceed the balance threshold value Vdet. The selector 158 determines the cell whose monitored cell voltage value exceeds the balance threshold value Vdet, from the signals received from the cell voltage detectors 151 through 155. The selector 158 outputs selection signals that operate the selection switches 111 through 115 so that the terminal current flows to the connection terminal that may be connected to the positive electrode of the cell that is determined by the selector 158. The current generation circuit 170 flows the terminal current to at least one of the V1 through V5 terminals, according to the selection signals received from the selector 159. As a result, the cell having the cell voltage value exceeding the balance threshold value Vdet is discharged.

The voltage applied to the terminals that are connected to the positive electrode and the negative electrode of the cell that is being discharged, decreases by a forward voltage Vf of the discharge transistor. For this reason, the control circuit 150 stops the discharge of the monitoring target when monitoring the cell voltage value of this monitoring target, in order to improve a detection accuracy of the cell voltage value.

For example, when the terminal current IV4 flows to the V4 terminal, the voltage of the V4 terminal decreases by a base-emitter voltage (forward voltage Vf) of the discharge transistor 24 that is externally connected. In this case, the cell voltage value of the cell 35 is monitored as being higher by the forward voltage Vf, and the cell voltage value of the cell 34 is monitored as being lower by the forward voltage Vf. Hence, during monitoring of the cell voltage values of the cell 35 and the cell 34, the control circuit 150 controls the current generation circuit 170 so as not to supply the terminal current IV4.

Accordingly, during the time in which the cell voltage value is monitored, for example, the current generation circuit 170 is controlled so as not to supply the terminal current to the connection terminal that may be connected to the positive electrode of the cell whose cell voltage value is being monitored, nor to the connection terminal that may be connected to the negative electrode of the cell whose cell voltage value is being monitored.

In addition, in a case in which the cell voltage values of all of the plurality of cells 31 through 35 exceed the cell balance threshold value Vdet, the cell voltage values of the cells 31 through 35 are in a balanced state, as illustrated in FIG. 4. Hence, in one embodiment, in the case in which the cell voltage values of all of the cells 31 through 35 exceed the cell balance threshold value Vdet, the control circuit 150 controls the current generation circuit 170 so as not to supply the terminal current to all of the cells 31 through 35. As a result, the cell discharge stops for all of the cells 31 through 35.

Further, in one embodiment, a cancel threshold value Vdet2 that is small compared to the cell balance threshold value Vdet is set in the cell voltage detectors 151 through 155 of the control circuit 150, for canceling the cell balance control. The cancel threshold value Vdet2 is an example of a second threshold value.

The selector 158 of the control circuit 150 outputs selection signals that control the selection switches 111 through 115 of the current generation circuit 170, so as not to supply the terminal current to the connection terminal that may be connected to the positive electrode of the cell whose cell voltage value lower than the cancel threshold value Vdet2 is monitored, as illustrated on a right part in FIG. 4.

Accordingly, in one embodiment, the V1 through V5 terminals are used in common as the terminals for detecting the cell voltage values and the terminals for controlling the cell balance. For this reason, the number of external connection terminals of the battery protection circuit 70 can be reduced, to reduce the cost. In addition, by time-divisionally monitoring the cell voltage values by the single detector 130, it is possible to reduce a chip size and a power consumption of the battery protection circuit 70. Further, the terminal currents when performing the cell balance control are supplied from the V1 through V5 terminals to the internal ground 171 via the internal current path of the battery protection circuit 70, and thus, all of the terminal currents are output from the VSS terminal. In other words, all of the terminal currents will not be output from a terminal (more particularly, the V1 through V5 terminals) other than the VSS terminal. Accordingly, it is possible to simultaneously discharge a plurality of cells. Moreover, because the current value of the terminal current is determined for each cell voltage value of each cells, it is possible to prevent the terminal current from being affected by the cell voltage value of another cell.

According to each of the embodiments, it is possible to provide a battery control circuit, a battery control device, and a battery pack, which can efficiently balance each of cell voltage values of a plurality of cells that are connected in series.

Further, the present invention is not limited to these embodiments, but various variations and modifications may be made without departing from the scope of the present invention.

A part of all of one example of the embodiment may be appropriately combined with or replaced by another example of the embodiment, to provide the variations and the modifications of the embodiments.

For example, although the example described above includes five cells that are connected in series in the rechargeable battery 20, the number of cells that are connected in series is not limited to five. In addition, the positions where the control transistors 1 and 2 are arranged in FIG. 1 may be interchanged.

In addition, the charge control transistor 1 and the discharge control transistor 2 may be inserted in the positive power supply path 9a instead of being inserted in the negative power supply path 9b.

Further, the discharge transistor is not limited to the bipolar transistor, and may be formed by other switching elements such as a MOS transistor or the like.

What is claimed is:

1. A battery control circuit for controlling a balance of cell voltage values of a plurality of cells that are coupled in series in a plurality of stages, comprising:
   an internal ground;
   an internal current path;
   a plurality of connection terminals, electrically connected to the internal ground via the internal current path, and configured to couple to positive electrodes of the plurality of cells, respectively;
   a ground terminal, electrically connected to the internal ground, and configured to couple to a negative electrode of a cell located at a lowest stage of the plurality of cells;
   a control circuit configured to select one of the plurality of cells to be discharged by selecting one of the plurality of connection terminals; and
   a current generation circuit configured to generate a plurality of terminal currents having current values which vary according to voltages between respective adjacent terminal pairs among the plurality of connection terminals and the ground terminal,
   wherein the current generation circuit shifts the voltages between the respective adjacent terminal pairs with reference to a potential of the internal ground, thereby generating the plurality of terminal currents based on the shifted voltages,
   wherein the selected one of the plurality of connection terminals, selected by the control circuit, is one of terminals forming one of the adjacent terminal pairs and having a potential higher than the other of the terminals forming the one of the adjacent terminal pairs, and
   wherein the control circuit selects one terminal current, from among the plurality of currents generated by the current generation circuit, to be supplied from the selected one of the plurality of connection terminals to the internal ground via the internal current path.

2. The battery control circuit as claimed in claim 1, wherein the current generation circuit supplies a terminal current to one of the plurality of connection terminals coupled to a positive electrode of a cell whose monitored cell voltage value exceeds a first threshold value.

3. The battery control circuit as claimed in claim 2, wherein the current generation circuit supplies no terminal current to all of the plurality of connection terminals in a case in which the cell voltage value of all of the plurality of cells exceeds the first threshold value.

4. The battery control circuit as claimed in claim 2, wherein the current generation circuit supplies no terminal current to one of the plurality of connection terminals coupled to a positive electrode of a cell whose monitored cell voltage value is lower than a second threshold value that is smaller than the first threshold value.

5. The battery control circuit as claimed in claim 1, wherein the current generation circuit supplies no terminal current to one of the plurality of connection terminals coupled to a positive electrode of a cell whose cell voltage value is monitored, nor to one of the plurality of connection terminals coupled to a negative electrode of a cell whose cell voltage value is monitored, during a time in which the cell voltage values are monitored.

6. The battery control circuit as claimed in claim 1, wherein the control circuit includes
   a cell selector configured to select one of the plurality of cells whose cell voltage value is to be monitored,
   a cell voltage detector configured to acquire a monitored result of the cell voltage value of the one of the plurality of cells selected by the cell selector, and
   a selector configured to select at least one of the plurality of connection terminals to which the terminal current is to be supplied, using the monitored result acquired by the cell voltage detector and the one of the plurality of cells selected by the cell selector.

7. A battery control device comprising:
   a cell balance circuit configured to balance cell voltage values of a plurality of cells coupled in series in a plurality of stages; and
   a battery control circuit configured to control the cell balance circuit,
   wherein the battery control circuit includes
      an internal ground;
      an internal current path;
      a plurality of connection terminals electrically connected to the internal ground via the internal current path, and configured to couple to positive electrodes of the plurality of cells, respectively,
      a ground terminal, electrically connected to the internal ground of the battery control circuit, and configured to couple to a negative electrode of a cell located at a lowest stage of the plurality of cells,
      a control circuit configured to select one of the plurality of cells to be discharged by selecting one of the plurality of connection terminals, and
      a current generation circuit configured to generate a plurality of terminal currents having current values which vary according to voltages between respective adjacent terminal pairs among the plurality of connection terminals and the ground terminal,
   wherein the current generation circuit shifts the voltages between the respective adjacent terminal pairs with reference to a potential of the internal ground, thereby generating the plurality of terminal currents based on the shifted voltages,
   wherein the selected one of the plurality of connection terminals, selected by the control circuit, is one of terminals forming one of the adjacent terminal pairs and having a potential higher than the other of the terminals forming the one of the adjacent terminal pairs, and
   wherein the control circuit selects one terminal current, from among the plurality of currents generated by the current generation circuit, to be supplied from the selected one of the plurality of connection terminals to the internal ground via the internal current path.

8. The battery control device as claimed in claim 7, wherein the current generation circuit of the battery control circuit supplies a terminal current to one of the plurality of connection terminals coupled to a positive electrode of a cell whose monitored cell voltage value exceeds a first threshold value.

9. The battery control device as claimed in claim 8, wherein the current generation circuit of the battery control circuit supplies no terminal current to all of the plurality of connection terminals in a case in which the cell voltage value of all of the plurality of cells exceeds the first threshold value.

10. The battery control device as claimed in claim 8, wherein the current generation circuit of the battery control circuit supplies no terminal current to one of the plurality of connection terminals coupled to a positive electrode of a cell whose monitored cell voltage value is lower than a second threshold value that is smaller than the first threshold value.

11. A battery pack comprising:
   a plurality of cells coupled in series in a plurality of stages;
   a cell balance circuit configured to balance cell voltage values of the plurality of cells; and
   a battery control circuit configured to control the cell balance circuit,
   wherein the battery control circuit includes
      an internal ground;
      an internal current path;
      a plurality of connection terminals electrically connected to the internal ground via the internal current path, and configured to couple to positive electrodes of the plurality of cells, respectively,
      a ground terminal, electrically connected to the internal ground, and configured to couple to a negative electrode of a cell located at a lowest stage of the plurality of cells,
      a control circuit configured to select one of the plurality of cells to be discharged by selecting one of the plurality of connection terminals, and
      a current generation circuit configured to generate a plurality of terminal currents having current values which vary according to voltages between respective adjacent terminal pairs among the plurality of connection terminals and the ground terminal,
   wherein the current generation circuit shifts the voltages between the respective adjacent terminal pairs with reference to a potential of the internal ground, thereby generating the plurality of terminal currents based on the shifted voltages,
   wherein the selected one of the plurality of connection terminals, selected by the control circuit, is one of terminals forming one of the adjacent terminal pairs and having a potential higher than the other of the terminals forming the one of the adjacent terminal pairs, and
   wherein the control circuit selects one terminal current, from among the plurality of currents generated by the current generation circuit, to be supplied from the selected one of the plurality of connection terminals to the internal ground via the internal current path.

12. The battery pack as claimed in claim 11, wherein the current generation circuit of the battery control circuit supplies a terminal current to one of the plurality of connection terminals coupled to a positive electrode of a cell whose monitored cell voltage value exceeds a first threshold value.

13. The battery pack as claimed in claim 12, wherein the current generation circuit of the battery control circuit supplies no terminal current to all of the plurality of connection terminals in a case in which the cell voltage value of all of the plurality of cells exceeds the first threshold value.

14. The battery pack as claimed in claim 12, wherein the current generation circuit of the battery control circuit supplies no terminal current to one of the plurality of connection terminals coupled to a positive electrode of a cell whose monitored cell voltage value is lower than a second threshold value that is smaller than the first threshold value.

15. A battery control circuit for controlling a balance of cell voltage values of a plurality of cells that are coupled in series in a plurality of stages, comprising:
   an internal ground;
   an internal current path;
   a plurality of connection terminals, electrically connected to the internal ground via the internal current path, and configured to couple to positive electrodes of the plurality of cells, respectively;
   a ground terminal, electrically connected to the internal ground, and configured to couple to a negative electrode of a cell located at a lowest stage of the plurality of cells;
   a control circuit configured to select one of the plurality of cells to be discharged by selecting one of the plurality of connection terminals; and
   a current generation circuit configured to generate a plurality of terminal currents having current values which vary according to voltages between respective adjacent terminal pairs among the plurality of connection terminals and the ground terminal,
   wherein the current generation circuit includes multiple level-shifters configured to shift the voltages between the respective adjacent terminal pairs with reference to a potential of the internal ground, respectively, thereby generating the plurality of terminal currents based on the shifted voltages,
   wherein the selected one of the plurality of connection terminals, selected by the control circuit, is one of terminals forming one of the adjacent terminal pairs and having a potential higher than the other of the terminals forming the one of the adjacent terminal pairs, and
   wherein the control circuit selects one terminal current, from among the plurality of currents generated by the current generation circuit, to be supplied from the selected one of the plurality of connection terminals to the internal ground via the internal current path.

* * * * *